Oct. 24, 1939. H. B. JOHNS 2,176,969
LOCK FOR VEHICLE DOORS
Filed April 13, 1934 2 Sheets-Sheet 1
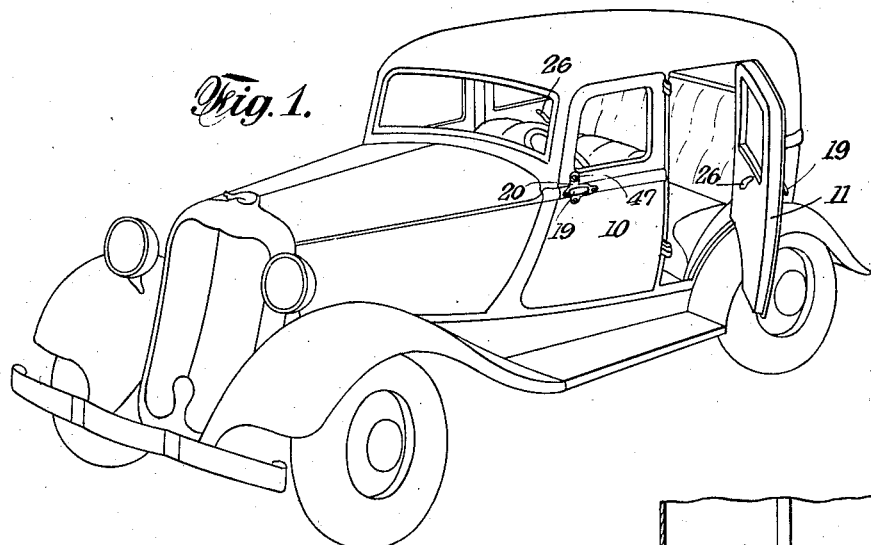
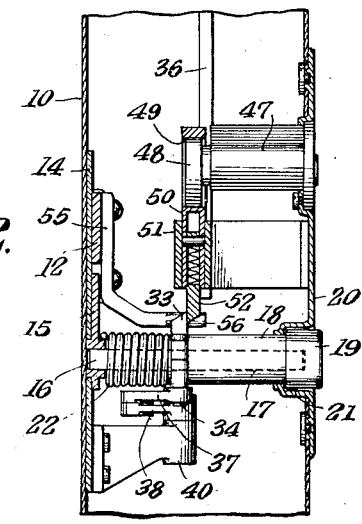
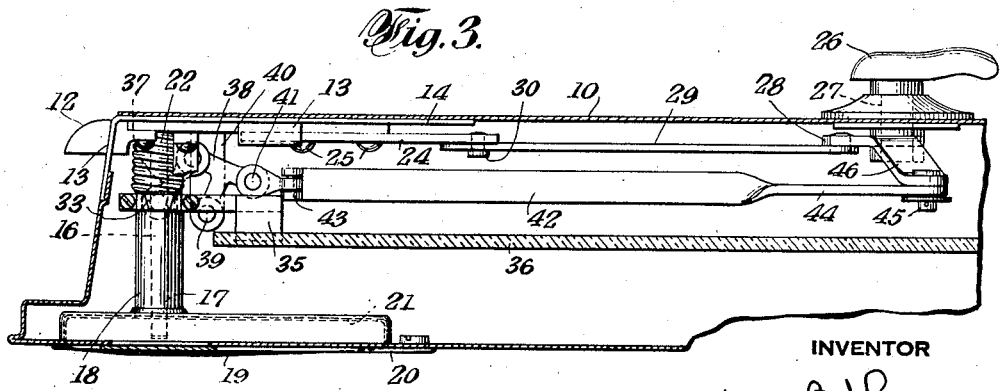
INVENTOR
Henry B. Johns Oct. 24, 1939.    H. B. JOHNS    2,176,969
LOCK FOR VEHICLE DOORS
Filed April 13, 1934    2 Sheets-Sheet 2
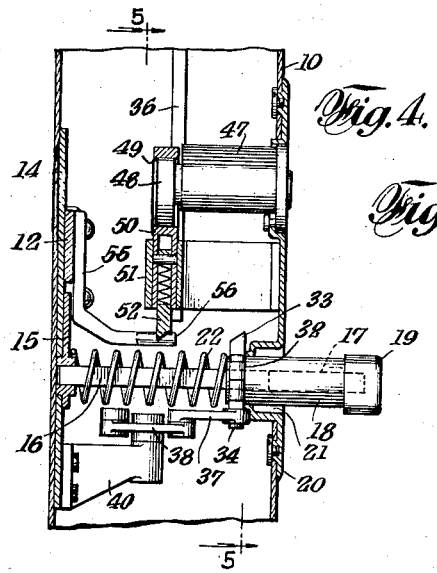
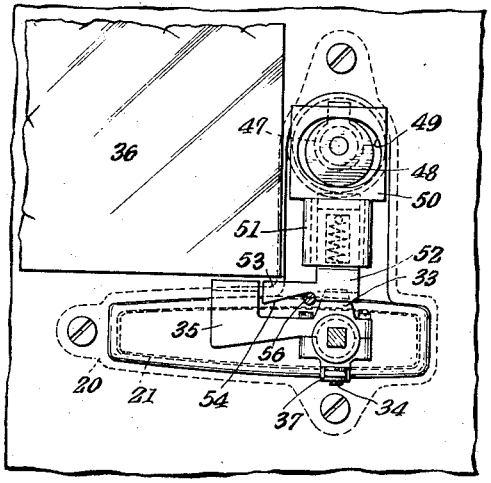
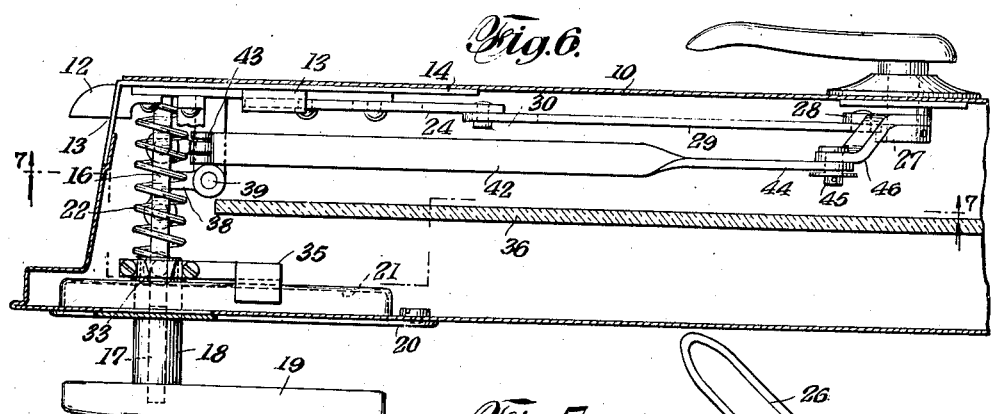
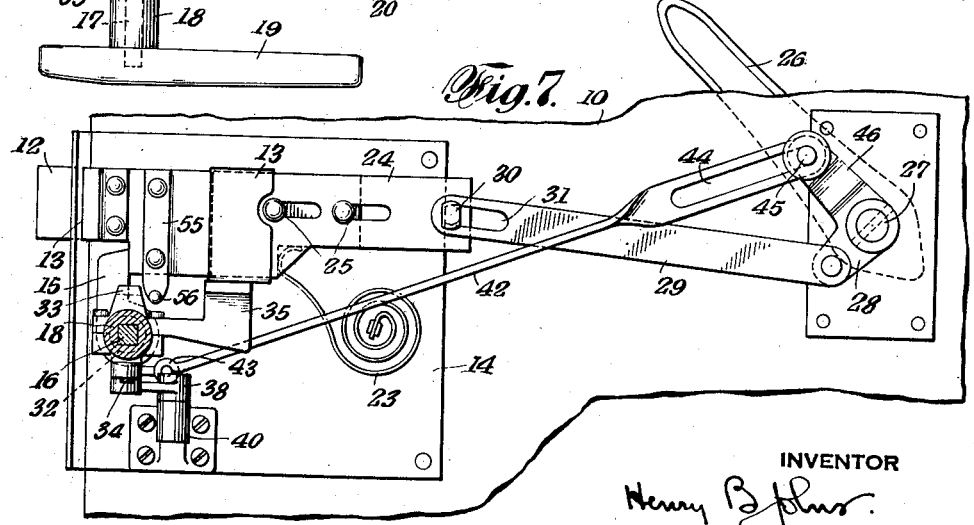
INVENTOR
Henry B. Johns Patented Oct. 24, 1939

2,176,969

UNITED STATES PATENT OFFICE 2,176,969

LOCK FOR VEHICLE DOORS

Henry B. Johns, New York, N. Y.

Application April 13, 1934, Serial No. 720,383

6 Claims. (Cl. 292—1)

The present invention relates to locks especially designed for use in motor vehicles although use in other fields are also contemplated.

As at present constructed, the locks of automobile doors are provided with handles which protrude so that may be grasped at all times. It is of course necessary to have them project beyond the outside of the doors for manipulation when the doors are unlocked, but that selfsame protrusion, when the doors are locked, provides a theft and damage hazard which this invention seeks to obviate. Locked vehicles have been broken into by the mere expedient of inserting between adjacent handles, a jack-like device to force them apart with a pressure sufficient to not only spring the doors open but to mar and mutilate them to the point where expensive repairs are necessary.

In addition to the theft and damage hazard there is the further disadvantage that the protruding handles offer means for unauthorized persons to enter the vehicle although occupied. This has often occured in recent years even at busy traffic points and the result was either a "hold up" of the occupants of the vehicle or a kidnapping. The advantages of having the door handles withdrawn into sockets so they may not be grasped, will readily be apparent when it is pointed out that not only cannot the doors be opened but there is afforded no means to which a person on the running board of the vehicle may hold on while surreptitiously seeking entrance to the interior thereof. A modern auto equipped with shatter proof glass and with locks having retractable handles designed in accordance with this invention will afford a safe haven for its occupants under circumstances above set forth.

This invention, therefore, contemplates improvements in vehicle lock structures which consist in equiping all the doors of such a vehicle with locks having handles which nest in recesses in the lock escutcheon plates when the doors are locked so they may not be tampered with by unauthorized persons.

An important object of the invention is to provide locks for vehicles, the handles of which may be drawn into the escutcheon plate recesses by a person within the vehicle so no one from the outside may open any of the doors.

Another object of the invention is to provide means in vehicle locks whereby the lock handles may be pushed into their recesses from the outside of the vehicle and thereby automatically locking the doors, key operated means being provided to reset one of the handles for manipulation.

Another object is to provide means whereby the door windows must be closed or only slightly open before the doors can be locked and the handles withdrawn.

A further object is to provide, in a motor vehicle, locks having handles which may be withdrawn, the locking means being either incorporated with the handle in one unitary assembly or being separate means associated with the handle and lock bolt.

These objects and advantageous features and others later apparent are accomplished by the novel and practical construction, combination and arrangement of parts hereinafter disclosed and illustrated in the accompanying drawings, constituting an essential part of this disclosure, and in which:

Figure 1 is a perspective view of a motor vehicle provided with locks constructed in accordance with this invention.

Figure 2 is a broken vertical sectional view through a lock, the handle being shown retracted.

Figure 3 is a plan sectional view thereof.

Figure 4 is a view similar to Figure 2 with the handle projected for manipulation.

Figure 5 is a vertical sectional view taken on the line 5—5 of Figure 4.

Figure 6 is a view similar to Figure 3 but with the parts as shown in Figure 4.

Figure 7 is a fragmentary vertical sectional view as taken along the line 7—7 of Figure 6.

Referring to the drawings in greater detail there is shown a closed motor vehicle having doors adapted to be locked. As is usual in vehicle of this type one of the doors such as 10 is provided with key operated lock means to afford entrance to the interior thereof, the other doors 11, when locked, being opened only from within the vehicle.

Since all the locks on the doors of the vehicle are similar with the exception that one door, such as door 10 is provided in addition with a key operated lock to raise pawl 52 from the door exterior, only one lock will be described.

The lock structure comprises the usual bolt 12 slidable in guides 13 on the plate 14 and two opposed handles for operating said bolt, one of which handles is retractable so it may not be manipulated to operate the bolt. Although no keeper for the bolt is illustrated, any usual form thereof may be employed to cooperate with the bolt.

A roll-back 15 fixed to the square shank 16 which is telescopically engaged in the similarly shaped hollow 17 of the handle shank 18, is adapted to be pivotally rocked by manipulation of the handle 19.

The handle shank 18 is journalled in the escutcheon plate 20 which is provided with a recess 21 of the same shape and size as the handle 19. Between the handle shank 18 and the roll-back 15 is preferably disposed a coil spring 22.

A usual type of bolt spring 23 is provided to normally hold the bolt projected and in this instance it is preferred to employ an auxiliary plate 24 having slotted connections as at 25 with the bolt.

The inner side of the door is provided with a handle 26 pivoted at 27 and provided with an arm 28 within the door structure. A connecting link 29 is provided between the arm 28 and a stud 30 on the plate 24. The link 29 is provided with the slot 31 where it engages the stud 30.

From the foregoing it is apparent that the bolt 12 may be withdrawn and the door opened either by rocking the handle 19 so the roll-back 15 will retract the bolt, or by rocking the handle 26 downward to pull the palte 24 and so through the connections 25 pull the bolt.

The handle shank 18 at its inner end is preferably formed with an annular groove 32 in which is clamped a member or members comprising the beveled dog 33, the link pivot trunnion 34 and a projecting portion 35 adapted to coact with the glass window 36 of the door in a manner later described.

The trunnion 34 has pivotally connected to it one end of a link 37, the other end of which is connected to one arm of a rock lever 38 pivoted at 39 to a bracket 40 fixed to the plate 14. Another arm of the rock lever 38 is pivotally connected at 41 to a link 42 provided with a knuckle joint 43 and having a slotted end 44 engaged over the pin 45 on the arm 46 which may be integrally made with the arm 28.

One of the doors such as 10 may be provided with a key operated cylinder lock 47 having an eccentric roll-back 48 engaged in an opening 49 of the yoke 50 which is arranged to move vertically in the guide 51.

A spring tensioned beveled pawl 52 is slidably engaged in the yoke and is provided with a lateral extension 53 having a sloping bottom edge 54. A member 55 is preferably affixed to the bolt 12 and its outermost end 56 normally protrudes to a position directly beneath and contiguous to the highest portion of the angled edge 54.

The other doors 11 of the vehicle are each also provided with the mechanism above described except that the cylinder lock 47 and the uppermost portion of the yoke 50 are omitted. In other respects all the doors may be identical.

In operation, if it is desired to lock the doors with the vehicle unoccupied, it is only necessary to push on the handles 19 of the doors so the dog 33 of each may latch behind its pawl 52. The link 37, lever 38 and link 42 will be moved thereby but the handle 26 will not be moved because the slot 44 in the link 42 will merely move up on the pin 45.

When the doors are to be opened a key is inserted in the cylinder lock 47 of the door 10 and when the key is rotated the eccentric roll-back 48 will raise the yoke 50 and its pawl 52 to free the handle 19 of that door which will be moved out by the spring 22 so it may be grasped and turned to retract the bolt of that door.

Access now being had to the interior of the vehicle it is only necessary to move the handle 26 of each door downwardly to retract the bolt 12 of that door. The projection 56 will then cam the pawl 52 upwardly through contact with the sloping edge 54 thereof to release the handle of that door so its spring 22 may project it out of its recess.

If it is desired to retract the handles 19 from within the vehicle, the handle 26 of each door is raised to pull on the link 42 and through the lever 38 and link 37 to pull the door handle until the dog 33 and pawl 52 are engaged. The handles 19 may be reset as previously described.

It will be noted that the window 36 is in the path of the projection 35 rigidly clamped to the handle shank except when the window is entirely raised thus preventing complete retraction of the handle. In this manner the vehicle may be locked only when all the windows are closed which eliminates the possibility of oversight of this important function. It may of course be arranged to have the windows slightly open if desired and yet permit retracting of the door handles.

While the invention has been described in considerable detail and in respect to a certain preferred embodiment thereof, it is of course understood that many changes in size, proportion and arrangement of the parts may well be made without departing from the general scope of the invention as set forth in the following claims.

What I claim as new and desire to secure by Letters Patent is:

1. In combination with the door of a vehicle having a movable glass panel, lock means including a retractable handle adapted to be moved into a recess in said door and means carried by the handle coacting with said panel whereby the handle can be retracted into the recess only when the panel is in a predetermined position.

2. In combination with the door of a vehicle having a movable glass panel, a lock having a retractable handle adapted to be moved into a recess in said door and means carried by the handle adapted to move across the path of movement of said panel, said handle being movable into its recess only when the panel is out of the path of movement of the handle carried means.

3. In a door, a movable panel, a lock having a handle retractable into a recess in said door, and means having interfering relation with said panel to prevent retraction of said handle into said recess when said panel is in the path of movement of said mentioned means.

4. In a door, a lock mechanism, means for manipulating said mechanism, a panel movable in said door, and means movable by said lock manipulating means across the path of movement of said panel.

5. In a door having a movable panel, means for locking said door including an actuating handle, and means movable upon actuation of said handle to lock said door only when said panel is out of the path of movement thereof.

6. In a door, in combination, lock mechanism for said door, means to operate said lock mechanism, a rotatable handle connected with said means and arranged for sliding movement, a panel in said door mounted for movement transversely to the sliding movement of said handle, and means carried by said handle and movable thereby into the path of movement of said panel.

HENRY B. JOHNS.